United States Patent Office 3,655,618
Patented Apr. 11, 1972

3,655,618
POLYVINYL HALIDE THIOETHER POLYMERS
Edward D. Weil, Yonkers, N.Y., assignor to Hooker Chemical Corporation, Niagara Falls, N.Y.
No Drawing. Continuation-in-part of application Ser. No. 651,689, July 7, 1967. This application Apr. 9, 1970, Ser. No. 27,115
Int. Cl. C08f 27/06, 27/07
U.S. Cl. 260—47 UP    5 Claims

ABSTRACT OF THE DISCLOSURE

Polyvinyl halide thioethers having aryl groups substituted on sulfur and wherein the polymers are of from 20,000 to 100,000 number average molecular weight are prepared by the displacement of halogen in polyvinyl halide with an aryl mercaptide in a polar solvent at elevated temperature in the presence of substantially equivalent amount of an alkali metal alkylate. The polymer is characterized by having substantially greater thermostability as compared to the unmodified polyvinyl halide polymer, good curability with formaldehyde in the manner of a phenolic and greater receptivity to dyes as compared to the unreacted polyvinyl halide, for example.

CROSS REFERENCES TO RELATED APPLICATIONS

This is a continuation-in-part of my copending application Ser. No. 651,689, filed July 7, 1967, now abandoned.

BACKGROUND OF THE INVENTION

Field of the invention

This invention concerns novel polyvinyl halide thioether polymers and their method of preparation. More particularly, the present invention relates to polyvinyl halide polymers that have been modified so as to enhance their properties and characteristics, particularly the improved stabilization against discoloration of these heat and light sensitive polymers. In addition, the invention relates to modification of these thermoplastic polymers so as to allow them to be cross-linked to thermosetting compositions and to improve their dye receptivity.

Description of the prior art

In the past, various stabilizing components and other modifying ingredients have been compounded with synthetic organic polymers and resins of all types in order to improve their properties and characteristics. Depending on the specific structure in many instances, the polymer is incapable of being used to proper advantage without the presence of considerable amounts of stabilizers. One such polymer requiring the presence of heat stabilizers is polyvinyl chloride. Other vinyl chlorides such as vinyl chloride-vinyl acetate copolymers similarly require the presence of heat stabilizers. Many different types of stabilizers have been used including organic tins, carboxylates, various epoxys, phosphites, nitrogen compounds, lead compounds, and the like.

Polyvinyl halide polymers and polyvinyl chloride-vinyl acetate copolymers are examples of polymers which are termed thermoplastic. In the structure of these polymers there are no sites for reaction with so-called cross-linking agents to effect vulcanization or cure to the thermoset state. Where it is desired that the polymer have greater rigidity, strength and elasticity, a vulcanization or cross-linking reaction is generally desired. This vulcanization can be distinguished from the plasticizing action which either chemically or physically breaks down a plastic material to a softer product.

SUMMARY OF THE INVENTION

According to the persent invention it has now been found that polyvinyl halide thioethers can be obtained by displacing the halogen of a polyvinyl halide polymer or copolymer in the presence of a polar solvent by reaction with a mercaptophenol corresponding to the formula

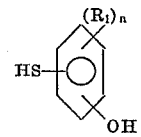

in which each $R_1$ is independently selected from the group consisting of hydrocarbyl, nitro, and halo substituents preferably being a member selected from the group consisting of halogen, alkyl, carbocyclic aryl, and arylalkyl in which "$n$" is from 0 to 4. In the preferred embodiment at least about 0.5 percent of the halogen of a conventional polyvinyl halide polymer has been replaced by the hydroxyphenyl thio groups of this invention.

A desirable objective of the present invention is to provide polymeric compositions having sufficient sites available for cross-linking so as to render the polymers thermosettable. Another objective of the present invention is to provide polymeric compositions having a high degree of utility for the forming or use in the making of products where a high degree of stability or resistance to heat and light discoloration during the forming operation are required. It is another object of this invention to provide a novel composition which is a polymer having a high degree of color stability, ability to absorb dye, and a high degree of stability to discoloration resulting from chemical activity and which is substantially non-flammable.

Other objects of this invention will become apparent from the following disclosure.

DETAILED DESCRIPTION OF THE INVENTION

The polyvinyl halide polymers and copolymers which have been found to be useful in preparing the compositions of the present invention are polymers having a number average molecular weight from about 20,000 to about 100,000. These polymers are thermoplastic and without further processing to impart heat or light resistance, they are badly discolored and degraded in physical properties by heating such as at 350° F. or by exposing to sunlight for a short time.

The mercapto-phenolic compounds which have been found suitable for reaction with the above polyvinyl halide polymers and copolymers are carbocyclic hydroxy aryls having from 6 to 24 carbon atoms of the formula

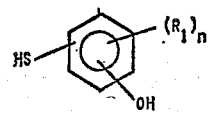

in which each $R_1$ is independently selected from the group consisting of a hydrocarbyl, nitro substituent and halogen, and $n$ is 0 to 4. The halogens are preferably chlorine, bromine, and fluorine. Preferably the hydrocarbyl substituents are alkyl of 1 to 18 carbon atoms, monocyclic aryl or alkylaryl and arylalkyl of 7 to 18 carbon atoms.

Suitable mercaptophenols for use in the making of the compounds of this invention typically include the preferred ortho and para non-alkyl-substituted mercaptophenols, as well as other mercaptophenol compounds having an alkyl substituent such as that defined above, in which the alkyl substituent is at the ortho or the para position. It should be understood, however, that there may be up to four alkyl substituents on the mercaptophenol molecule. However, if post-curing with formaldehyde or sulfur chloride is desired, there can be only up to three substituents, leaving one position open for crosslinking.

Examples of alkyl groups are methyl, ethyl, butyl, decyl, octadecyl; examples of alkylaryl and arylalkyl groups are cresyl, xylyl, tetramethylphenyl, decylphenyl, dodecylphenyl, and the like.

Representative mercaptophenols include phenyl mercaptophenols, and mercaptonaphthols, and mercaptocresols, for example. Typical mercaptophenols include 2-mercapto-6-octadecylphenol, 4-mercaptophenol, 2-mercapto-4-chlorophenol, 2-mercapto-4,6-di-tert-butylphenol, and o-mercaptophenol, for example. It also should be noted that polyhydric phenols are also suitable for employment in the present process. It also is possible to use mixtures of various mercaptophenols.

The typical polyvinylhalide compositions of this invention in which from about 0.5 percent up to about 50 percent of the halogen substituents can be replaced, are characterized by chemical and physical properties similar to those of polyvinyl halide, such as polyvinyl chloride, for example. Also included are those polymers which have been after halogenated, such as highly halogenated polyvinyl chloride resulting from after-chlorination thereof. However, additionally, these products in which 50 percent or less of the halogens have been replaced by sulfur-linked hydroxyphenyl groups of this invention, are characterized by the improved ink and/or dye retention referred to above, as compared to ordinary polyvinyl chloride films, for example. Additionally, these compositions have a built-in antoxidant groups, and when properly formulated are more resistant to deterioration. They may also be blended in with conventional vinyl resins such as polyvinyl chloride to serve as non-volatile, non-migratory stabilizers thereof. Additionally, as noted above, the preferred products of this invention have cross-linking sites, i.e., the phenolic "—OH" groups as well as the reactive phenolic ring, and are normally curable by, for example, formaldehyde in the presence of any suitable conventional catalyst, or alternatively by other conventional cross-linking agents such as the diisocyanates, sulfur chlorides, epoxides, and the like, referred to below.

Typical chlorine-containing polymers coming within the scope of this invention include, for example, (1) polymers and copolymers of vinyl chloride, (2) vinyl chloride polymers which have subsequently been further chlorinated, and (3) polymers and copolymers of vinylidene chloride, for example. Of the copolymers of the vinyl chloride, a typical vinyl chloride-vinyl ester copolymer is (polyvinyl chloride-vinyl acetate). Other copolymers include polyvinyl chloride-polyvinyl cyanide and polyvinyl chloride-polyethyl methacrylate, and the like. Polymers and copolymers of vinyl bromide are also useful, such as polyvinyl bromide and polyvinyl bromide-polyvinyl acetate copolymers.

The comonomers are generally unsaturated esters of 3 to 20 carbon atoms, preferably vinyl esters, and include vinyl acetate, vinyl cyanide, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The vinyl halide generally comprises about 75 to about 95 mol percent; preferably 85 to 95 mol percent of such copolymers.

Typically, a chlorine-containing vinyl polymer of the type disclosed hereinbefore, such as polyvinyl chloride, is reacted with a mercaptophenol which has been reacted prior to combination with the polyvinyl chloride polymer or copolymer with about one molar equivalent of a base such as an alkali metal methylate. Alternatively, the base may be added during the reaction of the mercaptophenol and the polyvinyl halide polymer or copolymer. Proportions are selected so as to obtain a yield of a polyvinyl chloride derivative in which about 0.1 percent (preferably 0.5 percent) to about 50 percent of the chlorine atoms have been replaced by the monomer-captophenol groups substituted through the sulfur atom.

The reaction of mercaptophenol and the halogen-containing polymer can be effected by a number of procedures. A solvent system can be employed, as illustrated in Example I, or the reaction can take place in the absence of a solvent. Thus, by sufficiently heating a salt of mercaptophenol with PVC, for example, e.g., during a milling operation, the mercaptophenol can be chemically bonded to the polymer. See, for example, Example IV below.

The reaction of the process of this invention is typically run in a solvent for polyvinyl chloride (for example) typical solvents including tetrahydrofuran, dimethylformamide, and cyclohexanone, and the like. The mercaptophenol can be reacted with a base either before admixture with the polyvinyl chloride or after admixture with the polyvinyl chloride, and typical suitable bases include sodium hydroxide, sodium methylate, potassium carbonate, calcium hydroxide, triethylamine, and the like. For a preferred embodiment, it is merely necessary that sufficient base should be employed to produce at least some mercaptide anions, to facilitate the substituting through the sulfur atom of the mercaptophenol groups.

Suitable reaction temperatures for the above representative process typically range from about 20° C. to about 220° C., with a preferred range of from about 40° C. to about 200° C. At the lower range of these temperatures, reaction is very slow, whereas at the higher temperatures of the range, some decomposition may occur. Accordingly, better results can be obtained within the preferred range.

A modified chlorinated vinyl resin of this invention can be cross-linked with any suitable reagent that will react with the phenolic ring, e.g., formaldehyde or a methylolphenol such as a resol, or with a hydroxyl group e.g., a diisocyanate or a diacid chloride or polyepoxide. Thus conventional compression molding or conventional extrusion of a formulation containing a suitable cross-linking agent and the modified chlorinated vinyl resin will give a polymer having improved properties with respect to retention of structural integrity at elevated temperatures and resistance to solvents.

The polymer or copolymer of this invention can be cross-linked with a conventional curing agent such as formaldehyde to form a linkage believed to be similar in structure to the methylene linkage formed between phenolic nuclei in a phenolic novolac resin. Sulfur dichloride or sulfur monochloride can also be used to form cross-links in the same manner as formaldehyde. A polyepoxide can be employed as a cross-linking agent. These epoxy resins are already known in the art. Some of the polyepoxides which can be used are the diglycidal ether of 2,2-bis(4-hydroxy-phenyl) propane, the diglycidyl ether of bis(4-hydroxy-phenol) methane, glycidyl ethers of glycerol, glycidyl ethers of tris(hydroxy-phenol) propane, glycidyl ethers of tetrakis(hydroxy-phenyl) ethane, epoxy-terminated polymeric reaction products of epichlorohydrin and 2,2-bis(4-hydroxy-phenol) propane, polymeric reaction products of epichlorohydrin and phenolformaldehyde-type polymers. Suitable diepoxides which can be employed as cross-linking agents are already known in the art. Suitable compounds are as follows: dicyclopentadiene diepoxide, vinyl cyclohexene diepoxide, limonene diepoxide, and 3,4-epoxy-6-methyl-cyclohexyl methyl 3,4-epoxy-6-methyl cyclohexyl carboxylate.

Also useful as cross-linking agents are the polyisocyanates such as 2,4-tolylene diisocyanate, 2,6-tolylene diisocyanate, 1,4-phenylene diisocyanate, 1,3-phenylene diisocyanate, 1,5-naphthalene diisocyanate, 4,4'-diphenylene diisocyanate, 3,3'-dimethyl-4,4'-diphenylene diisocyanate, 4,4'-diisocyanato diphenyl methane and 4,4',4''-triisocyanato triphenyl methane. In general, the cross-linking agents conventionally used in phenolic resin technology can be used for curing the novel polymers of this invention.

Introduction of a phenolic sulfide group into a polymer such as polyvinyl chloride advantageously serves as a polar site for the uptake of ink and/or dye, thus, facilitating printing of various forms of the polymer or coloring the polymer.

Other areas of application of the modified chlorinated vinyl resin will be evident to one skilled in the art. For example, a portion of the phenol-formaldehyde novolac making up a molding formulation can be replaced with the modified chlorinated vinyl resin. The reaction product of the modified chlorinated vinyl resin and a polysiocyanate in which excess isocyanate is used can be utilized as self-curing coatings.

The following examples are solely for purposes of illustration of certain embodiments of this invention, and accordingly are not intended to limit this invention. In this specification and claims, all parts are by weight and temperatures are given in degrees centigrade unless otherwise stated.

EXAMPLE I

To a solution of about 6.25 grams of polyvinyl chloride present in about 42 grams of tetrahydrofuran is added a solution of sodium o-hydroxyphenylmercaptide made by admixing about 4.4 g. of sodium methylate and about 12.6 g. of o-mercaptophenol in about 50 ml. of dimethylformamide. The mixture is refluxed for two hours, then poured into about 0.5 liter of water. The precipitated polymer is purified by reprecipitation from acetone solution by addition to methanol. The resultant product is a light colored resin which could be readily cast as a film on glass from tetrahydrofuran or acetone solution.

*Analysis.*—Calculated for

[—CH$_2$CHClCH$_2$CH(—SC$_6$H$_4$OH)—]

(percent): Cl, 16.6; S, 14.96. Found (percent): Cl; 15.1; S, 13.56. The product is soluble in aqueous sodium hydroxide.

EXAMPLE II

The reactant ratios of Example I are maintained, but the reaction is allowed to proceed for about 20 hours. Titration of evolved chloride ion shows that substantially all of the chlorine atoms of the polyvinyl chloride have been replaced. The product, after reprecipitation from tetrahydrofuran by addition to water and drying under reduced pressure is a colorless resin, moderately soluble in alcohol (in contrast to polyvinyl chloride). A film is easily fabricated by evaporation of a tetrahydrofuran solution of the product. It is clear and rather tough. Films and coatings of this material are cured by formaldehyde, or by sulfur chloride, thus rendering them insoluble in organic solvent.

EXAMPLE III

To a solution of about 125 g. of polyvinyl chloride in about 900 ml. of tetrahydrofuran is added about 12.6 g. of o-mercaptophenol and about 4.4 g. of sodium methylate in about 25 ml. of dimethylformamide. Upon mixing, a clear solution was obtained. This is refluxed for about 12 hours, during which time sodium chloride deposited. The resultant mixture is then poured into about two liters of water to precipitate the polymer. Volhard titration of the aqueous supernatant solution shows that about 1.5 percent of the chloride of the polyvinyl chloride has been displaced. The polymer is purified by dissolving in tetrahydrofuran and reprecipitation in methanol. After drying under vacuum, the product is found to be a colorless resin resembling polyvinyl chloride very closely. However, films made from this product are compared to ordinary polyvinyl chloride and found to have enhanced uptake of dyes and inks.

EXAMPLE IV

During milling in the absence of solvent, the sodium salt of o-mercaptophenol is heated with polyvinyl chloride at about 150° to about 180° C. for a period sufficient to produce a modified polyvinyl chloride in which the mercaptophenol is chemically bonded to the polyvinyl chloride polymer.

EXAMPLE V

Sodium methylate, 6.30 g. (0.158 mole) was added to a clear solution of 25 g. (0.4 equivalent) of PVC (Geon 92–59890), 20 g. (0.158 mole) of o-mercaptophenol and 500 ml. of tetrahydrofuran. The mixture was heated at reflux for 23 hours and then cooled and filtered. The filtrate was added slowly to 1.5 liter of a rapidly stirred solution of aqueous methanol. The sticky polymer was washed twice in a Waring Blendor with methanol. After drying for several days the polymer was chopped up in the blendor. The reaction product of polyvinylchloride and mercaptophenol, contained 8.51 percent sulfur and 0.05 percent mercaptan sulfur. The yield of product was 29.3 g. Suspended polymer in THF-Methanol goes into solution when 50 percent aqueous NaOH is added.

EXAMPLE VI

A solution of the Example V reaction product of polyvinylchloride and mercaptophenol and a solution of phenolformaldehyde in tetrahydrofuran was poured into a glass dish. After most of the tetrahydrofuran had volatilized, the film was cured at 90° for 20 hours. The film became translucent and tan in color. It was hard and tough.

Typical final products made from the polymers of this invention have, for example, conventional uses of thermoplastic or thermosetting polymers, as well as uses as films, coatings, building materials, adhesives, binders, molding resins, and the like.

It is within the scope of this invention to employ such equivalents and substitutents for various aspects of the novel composition of this invention as would be obvious to a person of ordinary skill in the art, and the invention disclosed herein is not limited by the specific embodiments disclosed herein.

I claim:
1. A polyvinyl halide homopolymer of from about 20,000 to 100,000 number average molecular weight modified to have 0.1 to 50 percent of units of the formula:

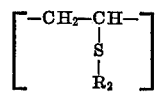

where each R$_2$ is independently selected from the group consisting of halogen substituted, alkyl substituted of 1 to 18 carbon atoms, monocyclic aryl substituted of 6 to 18 carbon atoms, alkylaryl substituted of 7 to 18 carbon atoms, arylalkyl substituted of 7 to 18 carbon atoms, nitro substituted, and unsubstituted carbocyclic hydroxy aryl of from 6 to 24 carbon atoms.

2. A polymer according to claim 1 wherein R$_2$ is hydroxyphenyl.

3. A copolymer which can be cross-linked, consisting of:
   (a) a vinyl halide, and
   (b) up to 15 percent of an unsaturated ester of 3 to 20 carbon atoms
   (c) said copolymer having a molecular weight of from about 20,000 to about 100,000 number average molecular weight and (d) said copolymer having 0.1 percent of about 50 percent of units of the formula:

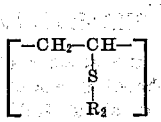

wherein each $R_2$ is independently selected from the group consisting of alkyl substituted of 1 to 18 carbon atoms, monocyclic aryl substituted of 6 to 18 carbon atoms, alkylaryl substituted of 7 to 18 carbon atoms, arylalkyl substituted of 7 to 18 carbon atoms, nitro substituted, halogen substituted, and unsubstituted carbocyclic hydroxy aryl of from 6 to 24 carbon atoms.

4. A copolymer according to claim 3 wherein the unsaturated ester is selected from the group consisting of vinyl acetate, vinyl cyanide, and methyl methacrylate.

5. A copolymer according to claim 4 wherein $R_2$ is hydroxyphenyl.

References Cited

UNITED STATES PATENTS

| | | | |
|---|---|---|---|
| 2,125,649 | 8/1938 | Reppe | 260—79.7 |
| 2,664,414 | 12/1953 | Morris | 260—78.5 |
| 2,964,493 | 12/1960 | Halkalg | 260—45.8 |
| 3,070,577 | 12/1962 | Stogryn | 260—62 |
| 3,091,537 | 5/1963 | Burness | 96—111 |
| 3,206,400 | 9/1965 | Flowers | 252—46.6 |
| 3,278,433 | 10/1966 | Feng | 252—48.4 |
| 3,282,979 | 11/1966 | Reifschneider | 260—465 |
| 3,317,479 | 5/1967 | Noshay | 260—77.5 |
| 3,342,790 | 9/1967 | De Vries | 260—79.5 |

JOSEPH L. SCHOFER, Pprimary Examiner

C. A. HENDERSON, Jr., Assistant Examiner

U.S. Cl. X.R.

117—122; 260—2 EC, 47 EC, 77.5 AT, 79.5 EC, 79.5 NV, 79.7, 85.5 S, 92.8 A, 836, 837 PV, 844